United States Patent
Rupp et al.

(10) Patent No.: US 6,871,240 B2
(45) Date of Patent: Mar. 22, 2005

(54) METHOD OF CONFIGURING A SAFE STATION AND SAFE CONTROL SYSTEM USING THE SAME

(75) Inventors: Roland Rupp, Hattenhofen (DE); Klaus Wohnhaas, Fellbach (DE); Hans Schwenkel, Stuttgart (DE)

(73) Assignee: Pilz GmbH & Co., Ostfildern (DE)

( * ) Notice: Subject to any disclaimer, the term of this patent is extended or adjusted under 35 U.S.C. 154(b) by 417 days.

(21) Appl. No.: 10/080,111

(22) Filed: Feb. 21, 2002

(65) Prior Publication Data

US 2002/0083246 A1 Jun. 27, 2002

Related U.S. Application Data

(63) Continuation of application No. PCT/EP00/08062, filed on Aug. 18, 2000.

(30) Foreign Application Priority Data

Aug. 23, 1999 (DE) .......................................... 199 39 919
Aug. 27, 1999 (DE) .......................................... 199 40 874

(51) Int. Cl.⁷ ............................................... G06F 3/00
(52) U.S. Cl. ............................ 710/8; 710/10; 709/222
(58) Field of Search .............................. 710/8, 10, 62, 710/100, 104–106, 109–110, 124, 220, 305, 313–314; 340/3.1; 700/1, 17–18; 709/221–222

(56) References Cited

U.S. PATENT DOCUMENTS

| | | | |
|---|---|---|---|
| 5,689,675 A | | 11/1997 | Buij et al. |
| 5,980,078 A | * | 11/1999 | Krivoshein et al. ............ 700/1 |
| 6,098,116 A | * | 8/2000 | Nixon et al. .................... 710/8 |
| 6,449,715 B1 | * | 9/2002 | Krivoshein ..................... 713/1 |
| 6,686,838 B1 | * | 2/2004 | Rezvani et al. ............. 340/506 |

FOREIGN PATENT DOCUMENTS

| | | |
|---|---|---|
| DE | 197 13 240 C2 | 1/1999 |
| DE | 197 33 906 A1 | 2/1999 |
| DE | 197 42 716 A1 | 4/1999 |
| EP | 0 173 905 A2 | 3/1986 |
| EP | 0 817 423 A1 | 1/1998 |
| EP | 0 905 594 A1 | 3/1999 |

* cited by examiner

*Primary Examiner*—Khanh Dang
(74) *Attorney, Agent, or Firm*—Harness, Dickey & Pierce, P.L.C.

(57) ABSTRACT

The present invention describes a method of allocating a defined user address to a safe bus user when connecting it to a field bus of a safe control system. The method comprises the step of sending out a first registration message from the safe bus user to an administration unit connected to the field bus. The first registration message contains a predetermined universal address. The method further comprises the step of sending out an address allocation message from the administration unit to the safe bus user, wherein the address allocation message contains the defined user address. Finally, the method comprises the step of storing the defined user address in a memory of the safe bus user.

19 Claims, 3 Drawing Sheets

METHOD OF CONFIGURING A SAFE STATION AND SAFE CONTROL SYSTEM USING THE SAME

CROSS-REFERENCES TO RELATED APPLICATIONS

This application is a continuation of copending international patent application PCT/EP00/08062 filed on Aug. 18, 2000 and designating the U.S., which claims priority of German patent applications DE 199 39 919.0, filed on Aug. 23, 1999, and DE 199 40 874.2, filed on Aug. 27, 1999.

BACKGROUND OF THE INVENTION

The present invention generally relates to a method of configuring a safe bus user when connecting it to a field bus of a safe control system, and more particularly, to a method of allocating a defined user address to the safe bus user when connecting it to the field bus.

In addition, the invention also relates to a control system for safely controlling safety-critical processes, said system comprising at least one safe bus user which is to be configured when connecting it to a field bus. The safe bus user comprises a receiver for receiving a bus message, an evaluator for evaluating the bus message, and a memory for storing a user address which is to be allocated to the bus user.

A field bus generally is a system for data communication, in which the connected bus users are linked to one another via s bus. For this reason, two bus users connected to the field bus can communicate with one another without being directly cabled to one another individually. Examples of known field buses are the so-called CAN bus, the so-called Profibus and the so-called Interbus.

The use of field buses has already been known sufficiently well for a relatively long time in the field of control and automation engineering. However, this does not apply to the control of safety-critical processes in which, in practice, the units involved in the controlling were individually cabled to one another until very recently. The reason for this is that the known field buses could not guarantee the fault tolerance required for controlling safety-critical processes (fault probability less than $10^{-11}$). Although all known field buses contain measures for fault protection during the data transmission, these measures are not sufficient for guaranteeing the required fault tolerance. Furthermore, field buses are open systems to which, in principle, any units can be connected. The risk is then that a unit which has nothing at all to do with a safety-critical process to be controlled will influence the latter un-intentionally.

A safety-critical process is understood to be a process in which an unacceptable risk arises for persons or material goods when a fault occurs. In the case of a safety critical process, therefore, it must be ensured with 100% reliability in the ideal case that the process is moved to a safe state when a fault occurs. In the case of a machine installation, this may mean that the installation is switched off. In the case of a chemical production process, however, switching off may cause an uncontrolled reaction in some circumstances so that it is better to run the process in an uncritical range of parameters in such a case.

Critical processes with regard to safety can also be subprocesses of larger higher-level overall processes. In the case of an hydraulic press, for example, the supply of material can be a subprocess which is not critical with regard to safety but the starting up of the press tool can be a critical subprocess with regard to safety. Other examples of critical (sub)processes with regard to safety are the monitoring of protective gratings, protective doors or light barriers, the control of two-hand switches or the monitoring and evaluation of an emergency off switch.

The units involved in controlling a critical process with regard to safety must have safety-related facilities going beyond their actual function in order to be licensed for critical tasks with regard to safety by the relevant supervisory authorities. These facilities are mainly used for monitoring faults and functions. As a rule, the units involved are redundantly configured in order to ensure safe operation even when a fault occurs. Units having such safety-related facilities will be designated as safe in the text which follows, in distinction from "normal" units.

The units connected to the field bus will be generally called bus users in the text which follows. In the case of a control system for safely controlling critical processes with regard to safety, the bus users are normally either control units or signal units. A control unit is a bus user which has a certain intelligence for controlling a process. In technical terminology, such bus users are usually called clients. They receive data and/or signals which represent state variables of the controlled processes and, in dependence on this information, activate actuators which influence the process to be controlled. The intelligence is normally stored in the form of a variable user program in a memory of the control units. As a rule, so-called PLCs (Programmable Logic Controllers) are used as control units.

By comparison, a signal unit is a bus user which essentially provides input and output channels (I/O channels) to which, on the one hand, sensors for receiving process variables, and, on the other hand, actuators can be connected. As a rule, the signal units do not have any intelligence in the form of a variable user program. They are normally called servers in technical terminology.

In many field buses such as, for example the CAN bus, it is known to allocate an individual user address to the individual bus users. The user address is used for selectively conveying bus messages with information to be transmitted from the transmitting bus user to the receiving bus user. In configuring a control system for controlling critical processes with regard to safety, the allocation of the user addresses to the bus users is a critical procedure with regard to safety. That is because, for example, if two different signal units pick up the state data of two different protective screens and forward them to the control unit, a wrong address allocation of the two signal units can lead to the control unit not switching off the movement of a machine to be protected even though the corresponding protective screen has been opened.

In the case of the generic control systems hitherto known or, respectively, the corresponding methods for configuring the safe bus users, the user addresses are set directly at the bus user. For this purpose, each bus user has either a mechanical coding switch, particularly a rotary switch, or a serial programming interface. One disadvantage of this solution is that the user addresses must be set directly at the location of the individual bus user. In the case of complex process controls in the industrial field, the individual bus users connected to the field bus can be up to several hundred meters apart, however. In this case, therefore, long walking distances are required for configuring a safe control system and these make setting up and configuring awkward.

Furthermore, due to the long walking distances, it is easily possible to lose one's overview in this case which can lead to faulty address allocations. Another significant disadvantage of the known solutions is that when a defective bus user is exchanged, its user address must be known so that it can subsequently be allocated to the replacement bus user. In the case of industrial installations which are frequently operated around the clock, this means that correspondingly knowledgeable personnel must always be available in order to exchange a defective bus user. In the case where the user address is allocated to the bus user via the serial interface with the aid of a programming device, the corresponding programming device is also always required.

When allocating a user address via a programming interface, there is the additional disadvantage that the user address allocated to the bus user cannot be recognized from the outside. As a result, there is the risk that a bus user which has been previously used with a different user address is accidentally operated with its old user address when it is used in a new environment. This risk is particularly great if a bus user which has already been used is to be integrated into another control system during a maintenance operation.

SUMMARY OF THE INVENTION

In view of the above, it is an object of the present invention to specify a method of the type mentioned at the outset that overcomes the before-mentioned deficiencies.

It is particularly an object of the invention to define a method by means of which a user address can be allocated to a safe bus user in a simple, and at the same time, fault proof manner from a central location.

It is another object of the invention to specify a control system having bus users which can safely be configured from a central location.

The objects are achieved, among others, by a method which comprises the following steps:
  sending out a first registration message from the safe bus user to an administration unit connected to the field bus, the first registration message containing a predetermined universal address,
  sending out an address allocation message from the administration unit to the safe bus user, the address allocation message containing the defined user address, and
  storing the defined user address in a memory of the safe bus user.

The objects are further achieved by a control system of the type initially mentioned, in which the bus user has a registering unit for registering under a predetermined universal address with an administration unit connected to the field bus, and a receiver for receiving and evaluating an address allocation message providing the user address to be allocated.

Using the method, it is possible to connect to the field bus the bus user to be configured, initially without allocating the individual user address. This bus user can register with said administration unit on the basis of the predetermined universal address. The administration unit is preferably a central administration unit for the entire control system. In the next step, the administration unit conveys the individual user address to the bus user to be configured. This is done with the aid of a special address allocation message which is sent by the administration unit to the bus user to be configured. The bus user addressed evaluates the received address allocation message by extracting the user address transmitted and then storing it in a memory. It preferably stores the user address in a nonvolatile memory such as, for example, an EEPROM.

Using this method makes it possible to allocate the defined user address to the safe bus user from a central point, namely the administration unit. If the control system is splayed out in space, the long walking distances previously required are thus eliminated. In addition, the possibility of configuring all bus users from a central point facilitates the overview and thus reduces the risk of accidentally allocating the wrong address. Since, in addition, both the safe bus user and the administration unit comprise safety-related facilities, the defined user address can be transmitted in a fault-tolerant manner despite the possibilities of faults of the bus system which exist per se.

In an embodiment of the method, the safe bus user, after receiving the address allocation message, sends out a second registration message to the administration unit, the second registration message containing the defined user address.

This measure has the advantage that the administration unit can check whether the safe bus user has not only received the allocated user address without errors but has also processed it without errors. This further increases the reliability of the address allocation. To illustrate, the said measure means that the safe bus user, after receiving its allocated user address, registers a second time with the administration unit. In addition, the measure has the further advantage that, from the point of view of the administration unit, the universal address is unambiguously released again. It is thus available for use by another bus user without there being a possibility of ambiguities with regard to the bus user affected.

In a further embodiment of the invention, the safe bus user only sends out the first registration message to the administration unit after receiving a defined maintenance message.

This measure has the advantage that the administration unit always retains control over the traffic on the field bus. Accordingly, it is impossible for a new bus user to be configured to enter into the traffic on the field bus without having first been released for this purpose by the administration unit. This, too, improves the safety of the control system since central control is ensured.

In a preferred embodiment of this measure, the safe bus user only sends out the first registration message to the administration unit after the first reception of the defined maintenance message, whereas it sends out the second registration message on repeated reception of the defined maintenance message.

This measure has the advantage that the maintenance message, can be sent out jointly simultaneously to all bus users connected to the field bus as a so-called broadcast message. This simplifies the method according to the invention since the registration of the new bus user to be configured is not disturbed or delayed by bus users already registered and configured. It also makes it possible to perform the method according to the invention with many fewer method steps. Depending on the actual implementation of the method according to the invention, the first reception can relate to the first reception after each switch-on of the control system. However, it preferably relates to the first reception after the bus user has been connected to the field bus.

In a further embodiment of the aforementioned measures, the defined maintenance message is only sent out after activation of a special maintenance mode of the administration unit.

The special maintenance mode is preferably activated by operating a key switch or a code lock which is connected to the administration unit. The special maintenance mode of the administration unit differs from all other operating modes of the administration unit in that it is only in this maintenance mode that the defined maintenance message is sent out. The measure has the advantage that the user addresses can only be allocated after a deliberate intervention in the safe control system. This prevents user addresses from accidentally being issued. This considerably reduces the risk of wrong allocation of user addresses.

In a further embodiment of the aforementioned measure, the administration unit automatically ends the special maintenance mode after reception of the second registration message.

This measure, too, considerably contributes to minimization of the risk of faulty address allocation since the special maintenance mode can only be activated in this case for a single address allocation in each case. Accordingly, a new, deliberate intervention in the safe control system is thus necessary for each allocation of a user address. This again considerably improves the safety of the system.

In a further embodiment of the aforementioned measures, the defined user address is transmitted to the administration unit at the beginning of the special maintenance mode.

As an alternative to this measure, it is possible for the administration unit to read the defined user address automatically from a memory and thus to allocate user addresses to the individual bus users in succession from a list of user addresses. By comparison, the aforementioned measure has the advantage that a deliberate action of the party wishing to perform the configuration of the bus users is again required for allocating each individual user address. This, too, considerably increases the safety of the address allocation.

In a further embodiment of the aforementioned measure, the administration unit generates a fault signal if the user address transmitted has already been allocated to a bus user connected to the field bus.

This measure, too, contributes to preventing faulty address allocation since it reliably prevents a multiple allocation of a user address to different bus users.

In a further embodiment of the invention, the administration unit sends out maintenance messages to all bus users connected to the field bus at defined time intervals.

This measure is in contrast to being able to send out a maintenance message only after an individual activation of a special maintenance mode in each case. By comparison, the said measure has the advantage that a new bus user can be connected in a very simple and comfortable manner while the control system is in operation. In this arrangement, the user address can be automatically selected by the administration unit from a list of possible user addresses or it can be transmitted to the administration unit before the new bus user is connected.

A further embodiment of the method according to the invention is characterized by the following steps:
  checking if all the bus users actively connected to the field bus are present by means of a nominal configuration of the bus users and by means of response messages of the bus users, and
  sending out the user address of a bus user recognized as no longer active as the defined user address.

This embodiment of the invention is particularly advantageous with regard to maintenance work on a safe control system which is already set up. This is because, using the known measure it is possible in a simple manner to exchange a defective bus user for a new bus user without deliberately having to allocate a user address to the new bus user. In this embodiment, the administration unit continuously checks whether all bus users registered with it are actively connected to the field bus. If an individual bus user is missing, this indicates a defect or that this bus user has already been disconnected from the field bus. The administration unit can identify the user address of this missing bus user on the basis of the known nominal configuration. As soon as a new bus user registers with the administration unit under the predetermined universal address, it is allocated the user address of the missing bus user. This makes it possible to exchange a defective bus user without having to manually allocate the old user address to the new bus user. This embodiment of the invention is preferably combined with the defined maintenance message only being sent out after activation of a special maintenance mode of the administration unit. This is because, a very high reliability with regard to the allocation of a user address is given, on the one hand, whereas, on the other hand, a defective bus user can be exchanged in a very simple manner and without technical knowledge. This is particularly advantageous with regard to production installations which are operated around the clock.

In a further embodiment of the invention, the administration unit generates a fault signal if more than one bus user sends out the first registration message.

This measure, too, has the advantage that the reliability is increased since simultaneous allocation of a user address to a number of bus users is prevented in this case.

In a further embodiment of the invention, at least the first registration message and the address allocation message are each answered with an acknowledgment message.

This measure causes the receiver of said messages to send back an acknowledgment message to the originator independently of their actual processing. This also considerably increases the reliability of the address allocation since it enables the originator to check whether the receiver has received the respective message without errors.

I goes without saying that the aforementioned features and those still to be explained in the following can be used not only in the combination specified in each case but also in other combinations or by themselves without departing from the scope of the present invention.

BRIEF DESCRIPTION OF THE DRAWINGS

Illustrative embodiments of the invention are explained in greater detail in the following and are shown in the drawing, in which.

DETAILED DESCRIPTION OF PREFERRED EMBODIMENTS

Figure 1:
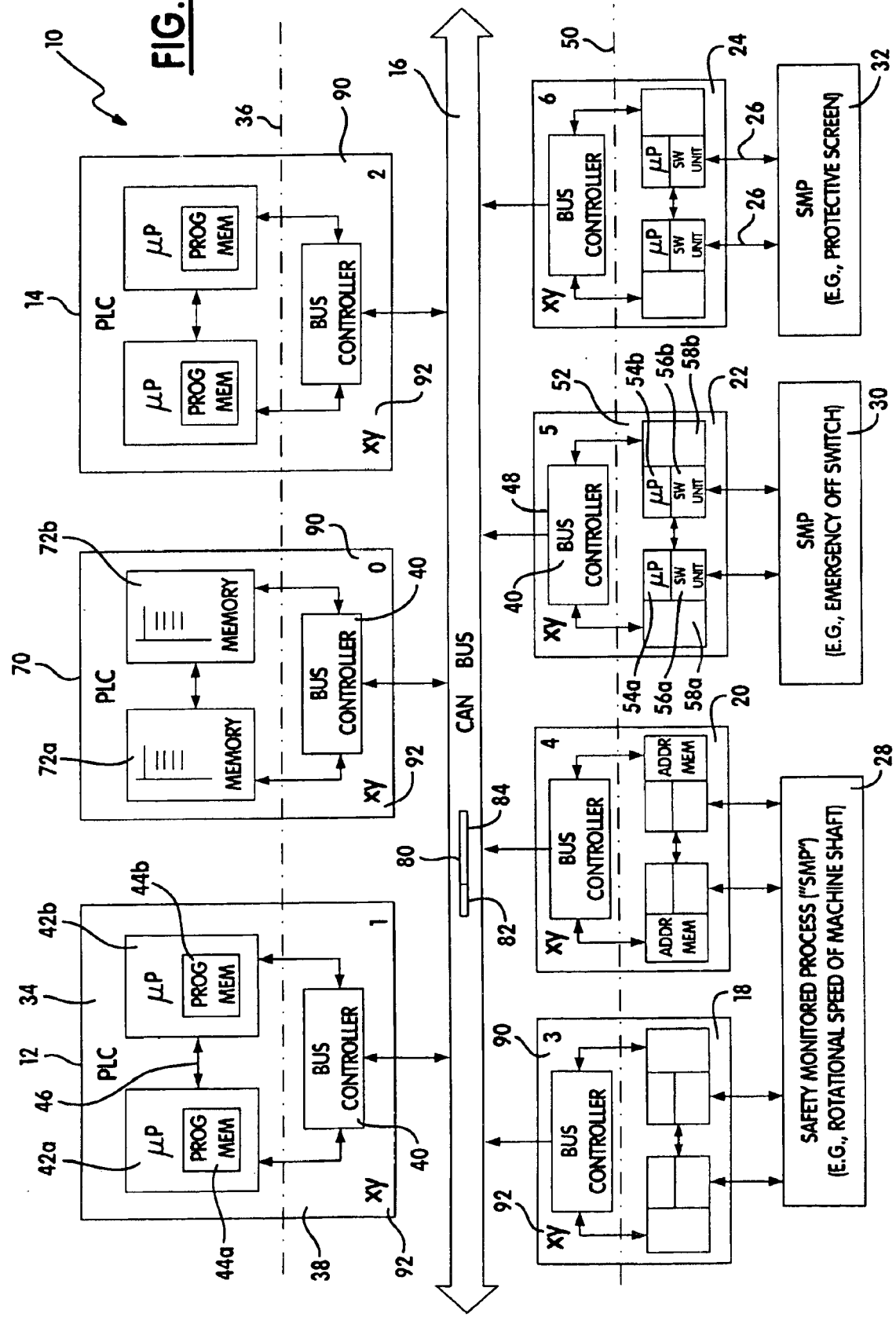
FIG. 1 shows a diagrammatic representation of a control system for safely controlling critical processes with regard to safety.

In FIG. 1, a control system for safely controlling critical processes with regard to safety is designated by the reference number 10 in its totality.

The control system 10 has two safe control units 12 and 14 which are connected to a total of four safe signal units 18, 20, 22 and 24 via a field bus 16. The control units 12, 14 and the signal units 18 to 24 are bus users in the sense of the present invention.

Each of the safe signal units 18 to 24 comprises a number of I/O channels by means of which each is connected to a critical process 28, 30, 32 with regard to safety. In the present case, the safe signal units 18 and 20 are connected to the process 28, whereas the signal unit 22 is connected to the process 30 and the signal unit 24 is connected to the process 32. The critical process 28 with regard to safety is, for example, the two-hand control of a machine installation in which, in addition, the rotational speed of a machine shaft, not shown here, is monitored. The critical process 30 with regard to safety is, for example, the monitoring of an emergency off switch and the critical process 32 with regard to safety is the monitoring of a protective screen (also not shown here).

The signal units 18 to 24 read in signals and/or data values of the critical process 28 to 32 with regard to safety via their I/O channels 26. Such signals or data values are, for example, the current rotational speed of the machine shaft and the switch position of the emergency off switch. On the other hand, the signal units 18 to 24 can act via the I/O channels 26 on actuators, not shown here, by means of which the critical processes 28 to 32 with regard to safety are influenced. Thus, for example, the critical process 30 with regard to safety, in which the switch position of the emergency off switch is monitored, includes an actuator by means of which the power supply of the controlled and monitored machine installation can be switched off.

The safe control units 12 and 14 are PLC controls. In principle, they are of identical construction and essentially differ by means of different application programs which are executed in them.

In the subsequent explanation of the control units 12, 14 and the signal units 18 to 24, respectively, the reference symbols mentioned in FIG. 1 are quoted only once for reasons of clarity.

The control units 12, 14 each contain a safe processing section 34 which is shown above the dot-dashed line 36 in FIG. 1. Below the line 36, a non-safe section 38 is located which essentially contains a chip 40 called the bus controller. The bus controller 40 is a standard chip in which the standard protocol of the field bus 16 used is implemented. The bus controller 40 is capable of independently handling the sending out and receiving of messages in the form of frames. The messages to be sent out are received by the bus controller 40 from the safe processing section 14. Conversely, the bus controller 40 provides received messages to the safe processing section 34.

In accordance with a preferred embodiment of the invention, the field bus 16 is a CAN bus in this case. In this bus, the messages to be sent out are transmitted within a user data field which is supplemented by additional control information for its travel via the field bus 16. The complete package of control information and user data field forms the bus message. The bus controller 40 is capable of independently embedding information received from the safe processing section 34 into the bus messages to be sent out in the form corresponding to the protocol. Conversely, it can extract the information contained in the user data field in a received bus message.

The safe processing section 34 of each control unit 12, 14 is configured with two-channel redundancy. Each of the two channels essentially contains a processor 42a, 42b with in each case associated peripherals by means of which an application program 44a, 44b is executed. The application program 44a, 44b contains the control of the machine installation and thus the intelligence of the control units 12, 14.

The two processors 42a, 42b execute safety-related tasks redundantly with respect to one another. In this process, they check each other which is shown by an arrow 46 in FIG. 1.

The safety-related tasks include, for example, measures for error protection of messages transmitted or sent out. These measures are carried out additionally and supplementarily to error protection measures which are already performed by the bus controller 40 as standard measures. This makes it possible to considerably increase the fault probability compared with the field bus 16 which is non-safe per se.

The signal units 18 to 24 are connected to the field bus 16 via the same bus controller 40 as the safe control units 12, 14. Correspondingly, the section 48 above line 50 in FIG. 1 is again non-safe in the sense of the present invention. In the safe processing section below line 50, each signal unit 18 to 24 is again configured with two-channel redundancy. The two redundant processing channels are again capable of performing mutual error monitoring.

Each of the processing channels of the signal units 18 to 24 has a processor 54a, 54b and a switching means 56a, 56b. The reference numbers 58a, 58b in each case designate a memory in which, on the one hand, a predetermined universal address is stored and in which the processors 54a, 54b, on the other hand, can store an allocated user address. In connection with the bus controller 40, therefore, each signal unit 18 to 24 is capable of registering with an administration unit connected to the field bus under the predetermined universal address and conversely of receiving and evaluating an address allocation message with an associated user address. The safe control units 12, 14 also have the same capability even though this is not explicitly shown in FIG. 1.

The switching means 56a, 56b enable the signal units 18 to 24 to activate the actuators, not shown here, for influencing the critical processes 28 to 32 with regard to safety. Thus, the safe signal units 18 to 24 are capable of placing the critical processes 28 to 32 with regard to safety into a safe state such as, for example, switching off the machine installation on actuation of the emergency off switch.

The aforementioned administration unit, also called management device in technical terminology, is designated by reference number 70 in FIG. 1. The administration unit 70 is also connected to the field bus 16 via a bus controller 40. It can, therefore, communicate with the remaining units connected to the field bus 16. It is not, however, involved directly in controlling the safety-critical processes 28 to 32.

In its safe processing section, the administration unit 70 essentially has two mutually redundant memories 72a, 72b in which, among other things, the entire configuration of the control system 10 and particularly the allocation of the defined user addresses to the bus users 12, 14 and 18 to 24 is stored. The administration unit 70 has a central administration and monitoring function which runs independently of the control of the processes 28 to 32. For example, the administration unit 70 initiates at regular time intervals a connection check between the control units 12, 14 and the signal units 18 to 24. During this process, the administration unit 70 checks, by sending out a connection check message to the control units 12, 14 whether the connection to these control units operates without errors. As a response to this check message, the control units 12, 14 in turn, send out check messages to their associated signal units 18 to 24. During this process, the administration unit 70 monitors the entire data traffic and, as a result, receives information at regular time intervals on whether all bus users known to it are still actively connected to the field bus 16. If an expected check message is missing or if an expected response message is missing, the administration unit generates an error message on the basis of which the safety-critical processes 28 to 32 are transferred into their safe state.

As an alternative to the illustrative embodiment shown here, the administration unit 70 can also be integrated in one of the control units 12, 14. In this case, the administration unit 70 represents a functional block within the control unit 12, 14.

In another illustrative embodiment, also not shown here, the control system 10 has only one control unit 12.

The reference number 80 designates by way of example a bus message which is transmitted between two bus users via the field bus 16. The bus message 80 comprises an address field 82 and a user data field 84 in accordance with the standardized protocol used. In addition, other control information not shown here can be contained in the bus message 80.

In the representation in FIG. 1, each of the units connected to the field bus 16 is allocated an individual defined user address 90 which is assumed to be "2" by way of example in the control unit 14. Accordingly, the administration unit 70 has the defined user address "0" and the signal unit 18 has the user address "3" by way of example. In addition, a predetermined universal address 92 which is symbolically shown as "xy" in FIG. 1 is stored in each unit. Naturally, both the user address 90 and the universal address 92 are in each case stored as a data value in a memory of the individual units.

Figure 2:
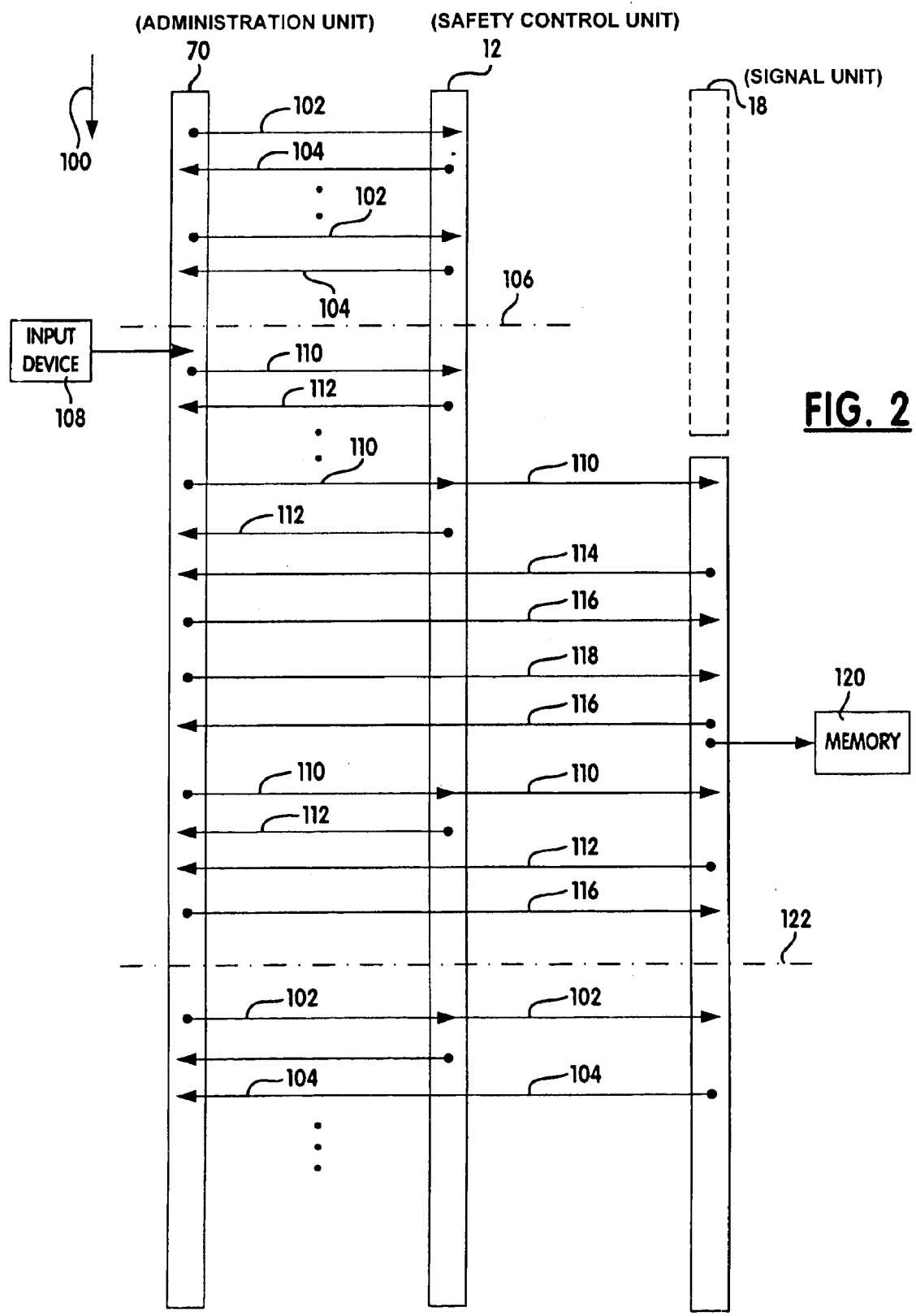
FIG. 2 shows the flow of communication between an administration unit and two bus users in a first illustrative embodiment of the invention.

In FIG. 2, the flow of communication in time during configuration of the signal unit 18 is shown with the example of the administration unit 70, the safe control unit 12 and the safe signal unit 18. In this example, a time axis extends in the direction of the arrow 100. The individual messages sent out between the various units are symbolized by means of arrows, the starting point of which is provided with a dot at the originator and the end point of which in each case refers to the receiver.

In the first time section in FIG. 2, the safe signal unit 18 is not yet connected to the field bus 16. It is, therefore, only shown dashed in this time section. The administration unit 70 is sending out a connection check message 102 at regular time intervals to the control unit 12. This then responds with a response message 104. The reception of the response message 104 within a predetermined period of time is monitored by the administration unit 70. As a result, the administration unit 70 is capable of comparing the actual number of units actively connected to the field bus 16 with the nominal number in accordance with a nominal configuration. After the predetermined period of time has elapsed, the process is repeated, i.e. the administration unit 70 again sends out the connection check message 102 and receives the response message 104.

It will be assumed now that the signal unit 18 is to be newly connected to the field bus 16. Accordingly, the signal unit 18 must be configured and it is allocated a defined user address 90. According to the illustrative embodiment of the invention shown here, the administration unit 70 is first placed into a special maintenance mode. In the preferred illustrative embodiment, this is done by means of a key switch which is arranged at the administration unit 70. The activation of the special maintenance mode is symbolized by means of line 106 in FIG. 2.

After the special maintenance mode has been activated, the defined user address 90 which is to be allocated to the signal unit 18 is transmitted to the administration unit 70 with the aid of an input device 108. After that, the administration unit 70 sends out a defined maintenance message 110 which differs from the connection check message 102 in the normal operating mode of the administration unit 70.

The control unit 12 already connected to the field bus 16 responds to the reception of the maintenance message 110 with a registration message 112 which contains the defined user address of the control unit 12, that is to say, for example, the user address "1" by way of example. The registration message 112 is thus the second registration message in the sense of the present invention. According to a preferred embodiment of the invention, the registration message 112 of the control unit 12 is identical to the aforementioned response message 104. However, this is not mandatory for carrying out the method.

The sending out of the maintenance message 110 and the reception of the second registration message 112 is repeated cyclically. During this time, it is possible to connect the safe signal unit 18 to the field bus 16. After this has been done, the signal unit 18 and the control unit 12 receive the maintenance message 110. Whereas the control unit 12 responds to this maintenance message 110 with the second registration message 112 as described above, the signal unit 18, in response to the first reception of the maintenance message 110, sends out a first registration message 114 which contains the predetermined universal address "xy". The administration unit 70 receives the first registration message 114 and sends out an acknowledgment message 116 to the signal unit 18. Following this, the administration unit 70 sends out an address allocation message 118, the user data field of which contains the defined user address "3". The signal unit 18 acknowledges reception of the address allocation message 118 with an acknowledgment message 116. After that, the signal unit 18 stores the defined user address "3" in a memory 120.

Once the administration unit 70 has received the acknowledgment message 116 from the signal unit 18, it again sends out the maintenance message 110. Following this, the control unit 12 registers with the administration unit 70 with the second registration message 112 as usual. In addition, however, the signal unit 18 now registers with the administration unit 70 with its second registration message 112. In this case, the second registration message 112 contains the user address "3" which has been allocated to the signal unit 18. The administration unit 70 acknowledges reception of the second registration message 112 with an acknowledgment message 116.

After the message traffic described has been completed, the signal unit 18 is configured in the sense of the present invention. According to the preferred illustrative embodiment of the invention, the administration unit 70, therefore, automatically ends the special maintenance mode which is indicated by means of line 122. After that, the normal data traffic between the administration unit 70 and the units 12, 18 connected to the field bus 16 again takes place as described above. During this process, the administration unit 70 sends out the connection test message 102 at cyclic time intervals and receives the response messages 104.

In another illustrative embodiment of the invention, the administration unit 70, in deviation from the sequence shown here, already ends the special maintenance mode after the allocated address has been stored in the signal unit 18. In this case, the signal unit 18 only registers with the administration unit 70 again with the second registration message 112 in the normal operating mode of the said unit.

For reasons of clarity, the sending out of the acknowledgment message 116 has only been mentioned here with respect to the signal unit 18 to be configured. In deviation from this, however, each message sent out is answered with an acknowledgment message 116 in the preferred illustrative embodiment of the control system 10. Lack of an acknowledgment message 116 automatically leads to an error message being generated.

Figure 3:
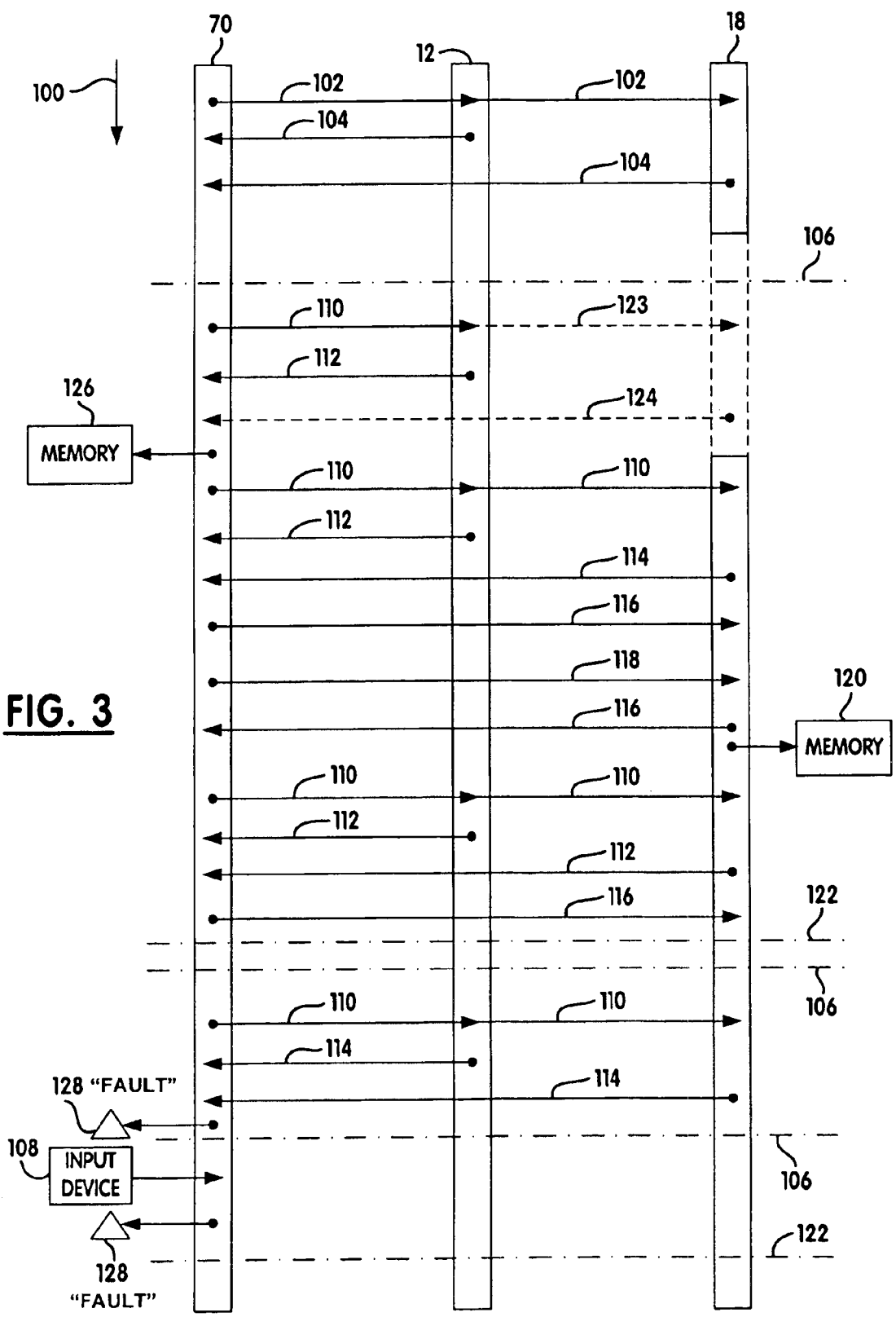
FIG. 3 shows the flow of communication between the administration unit and the two bus users in further illustrative embodiments of the invention.

FIG. 3 shows the flow of the method according to the invention during an exchange of the signal unit 18. Here, too, the administration unit 70 is initially in its normal operating mode in which it sends out connection check messages 102 at cyclic time intervals to all units connected to the field bus 16. The units connected, in this case the control unit 12 and signal unit 18, respond with corresponding response messages 104. These response messages inform the administration unit 70 about the number of units 12, 18 actively connected to the field bus 16.

In order to exchange the signal unit 18, the administration unit 70 is first placed into the special maintenance mode. This is shown by means of line 106. Before that, the signal unit 18 to be exchanged was disconnected from the field bus 16.

In the special maintenance mode, the administration unit 70, as explained, sends out a defined maintenance message 110 which, however, no longer reaches the signal unit 18. This is shown by means of the dashed arrow 123 in FIG. 3. The control unit 12 responds to the reception of the maintenance message 110 with the second registration message 112 as usual. The second registration message of the signal unit 18, on the other hand, is missing which is shown by the dashed arrow 124. The administration unit 70 can recognize, therefore, that the signal unit 18 is no longer actively connected to the field bus 16. It, therefore, stores the defined user address, "3", which was allocated to the signal unit 18, in a memory 126. After that, it again sends out the maintenance message 110 at cyclic time intervals. As explained, the control unit 12 responds to this with the second registration message 112.

The signal unit 18 or a corresponding replacement device can now be connected to the field bus 16.

As soon as the newly connected signal unit 18 receives the maintenance message 110, it sends out the first registration message 114 containing the predetermined universal address "xy". The new signal unit 18 registers by this means with the administration unit 70 under the predetermined universal address "xy". As already explained, the administration unit 70 acknowledges the reception of the first registration message 114 with an acknowledgment message 116 and then sends out the address allocation message 118. This then contains the defined user address "3" which the administration unit 70 has previously stored in the memory 126. The signal unit 18 acknowledges the reception of the address allocation message 118 with an acknowledgment message 116 and stores the allocated user address "3" in its memory 120. After that, the administration unit 70 again sends out the maintenance message 110 and receives the second registration message 112 both from the control unit 12 and from the signal unit 18. It acknowledges the reception of these registration message with the acknowledgment message 116 and ends the special maintenance mode which is again shown by means of line 122.

This method described thus makes it possible to exchange a bus user connected to the field bus 16 without having to know its defined user address.

In the next time segment in FIG. 3, the method sequence is shown which results if a number of bus users register with the administration unit 70 under the predetermined universal address "xy". As previously described, the administration unit 70 has first been placed into the special maintenance mode. It then sends out the maintenance message 110. If then both the control unit 12 and signal unit 18 respond with the first registration message 114, the administration unit 70 activates a fault indication 128 and terminates the special maintenance mode.

In the next time segment, another error source is shown. It is assumed here that a user address which is already allocated to a bus user connected to the field bus 16 is transmitted to the administration unit 70 via the input device 108 after the special maintenance mode has been activated. From the nominal configuration of the active bus users known to it, the administration unit 70 recognizes that the address has been allocated twice and activates the error indication 128. It also again terminates the special maintenance mode.

According to another preferred embodiment of the invention, the defined user address 90 is in this case additionally correlated with a functional process address, allocated to the respective signal unit 18–24, in a process map of the PLC control units 12 and 14, respectively, where the application programs 44*a*, 44*b* access these process maps in a manner known per se in the case of PLC controls. The functional process address unambiguously identifies the function of a sensor or actuator, for example a light barrier, connected to the signal units 18–24. This provides the defined user address 90 with a dual function since, on the one hand, it makes the signal units 18–24 identifiable for communication on the field bus 16, and on the other hand, provides the application programs 44*a*, 44*b* with a capability of accessing the process data which always remains the same.

What is claimed is:

1. In a safe control system comprising a field bus, an administration unit and a plurality of field bus users, all of which being connected to said field bus, a method of allocating a defined user address to a selected bus user when connecting the same to said field bus, said method comprising the steps of:

activating a special maintenance mode in said administration unit, repeatedly sending out a defined maintenance message from said administration unit to said plurality of bus users, connecting said selected bus user to said field bus, receiving said defined maintenance message by said selected bus user, sending out a first registration message from said selected bus user to said administration unit, said first registration message containing a predetermined universal address, sending out an address allocation message from said administration unit to said selected bus user, said address allocation message containing said defined user address to be allocated, receiving said address allocation message by said selected bus user, and storing said defined user address in a memory of said selected bus user.

2. The method of claim 1, wherein said selected bus user, after receiving said address allocation message, sends out a second registration message to said administration unit, said second registration message containing said defined user address.

3. The method of claim 2, wherein said administration unit automatically terminates said special maintenance mode after reception of said second registration message from said selected bus user.

4. The method of claim 2, wherein said selected bus user sends out said first registration message to said administration unit only after the first reception of said defined maintenance message, whereas it sends out said second registration message to said administration unit on each following reception of said defined maintenance message.

5. The method of claim 1, wherein said defined user address is transmitted to said administration unit from an external input device at the beginning of said special maintenance mode.

6. The method of claim 1, wherein said administration unit generates a fault signal if it receives more than one first registration messages.

7. The method of claim 1, wherein said first registration message and said address allocation message are each answered with an acknowledgment message.

8. In a safe control system comprising a field bus, an administration unit and a plurality of field bus users, all of which being connected to said field bus, a method of allocating a defined user address to an exchange bus user which is intended to replace an old bus user, wherein said old bus user comprises an old user address, said method comprising the steps of:

providing a nominal configuration of said control system in said administration unit, said nominal configuration representing the number and user addresses of all bus users connected to said field bus, disconnecting said old bus user from said field bus, activating a special maintenance mode in said administration unit, repeatedly sending out a defined maintenance message from said administration unit to the remaining ones of said plurality of bus users connected, sending out response messages from the remaining ones of said plurality of bus users to said administration unit, identifying said old bus user by means of said nominal configuration and said response messages, selecting said old user address as defined user address to be allocated to said exchange bus user, connecting said exchange bus user to said field bus, receiving said defined maintenance message by said exchange bus user, sending out a first registration message from said exchange bus user to said administration unit, said first registration message containing a predetermined universal address, sending out an address allocation message from said administration unit to said exchange bus user, said address allocation message containing said defined user address to be allocated, receiving said address allocation message in said exchange bus user, and storing said defined user address in a memory of said exchange bus user.

9. A method of configuring a field bus user when connecting it to a field bus of a safe control system, wherein a defined user address is allocated to said field bus user, said method comprising the steps of:

sending out a first registration message from said field bus user to an administration unit connected to said field bus, said first registration message containing a predetermined universal address, sending out an address allocation message from said administration unit to said field bus user, said address allocation message containing said defined user address to be allocated, and storing said defined user address in a memory of said field bus user, wherein said field bus user, after receiving said address allocation message, sends out a second registration message to said administration unit, said second registration message containing said defined user address.

10. The method of claim 11 wherein said field bus user sends out said first registration message to said administration unit only after the first reception of said defined maintenance message, whereas it sends out said second registration message to said administration unit on repeated reception of said defined maintenance message.

11. The method of claim 9, wherein said field bus user sends out said first registration message to said administration unit after receiving a defined maintenance message, and further wherein said defined maintenance message is sent out only after activation of a special maintenance mode of said administration unit.

12. The method of claim 11, wherein said administration unit automatically terminates said special maintenance mode after reception of said second registration message.

13. The method of claim 11, wherein said defined user address is transmitted to said administration unit at the beginning of said special maintenance mode.

14. The method of claim 13, wherein said administration unit generates a fault signal if it is determined that said user address transmitted has already been allocated to a bus user connected to said field bus.

15. The method of claim 9, wherein said field bus user sends out said first registration message to said administration unit after receiving a defined maintenance message, and further wherein said administration unit sends out defined maintenance messages to all bus users connected to said field bus at predefined time intervals.

16. The method of claim 9, wherein said administration unit generates a fault signal if more than one bus user sends out said first registration message.

17. The method of claim 9, wherein said first registration message and said address allocation message are each answered with an acknowledgment message.

18. A method of configuring a field bus user when connecting it to a field bus of a safe control system, wherein a defined user address is allocated to said field bus user, said method comprising the steps of:

sending out a first registration message from said field bus user to an administration unit connected to said field bus, said first registration message containing a predetermined universal address, sending out an address allocation message from said administration unit to said field bus user, said address allocation message containing said defined user address to be allocated, storing said defined user address in a memory of said field bus user, checking if all said bus users connected to said field bus are actively present by means of a nominal configuration of bus users and by means of response messages of said bus users, and sending out the user address of a bus user which is recognized as no longer active as said defined user address.

19. A control system for safely controlling safety-critical processes, comprising a field bus, an administration unit, and at least one field bus user all of which being connected to said field bus, said administration unit and said field bus user comprisina controller and memory means for communication therebetween via said field bus, said field bus user comprising a registering unit for registering with said administration unit under a predetermined universal address, a memory for storing a user address allocated to said field bus user, and a receiver for receiving and evaluating an address allocation message from said administration unit, said address allocation message containing said user address to be allocated; wherein said field bus user is adapted to send out a second registration message to the administration unit, said second registration message containing said allocated user address.

* * * * *

UNITED STATES PATENT AND TRADEMARK OFFICE
CERTIFICATE OF CORRECTION

PATENT NO.    : 6,871,240 B2
DATED         : March 22, 2005
INVENTOR(S)   : Roland Rupp et al.

It is certified that error appears in the above-identified patent and that said Letters Patent is hereby corrected as shown below:

Column 13,
Line 66, "containina" should be -- containing --.

Column 14,
Line 7, "claim 11" should be -- claim 9 --;
Line 66, "comprisina" should be -- comprising --.

Signed and Sealed this

Twenty-fourth Day of May, 2005

JON W. DUDAS
*Director of the United States Patent and Trademark Office*